United States Patent [19]

Rippe

[11] Patent Number: 5,347,680
[45] Date of Patent: Sep. 20, 1994

[54] SPRING RETRACTING CASTER

[75] Inventor: Jeffrey A. Rippe, Cypress, Calif.

[73] Assignee: Northrop Corporation, Los Angeles, Calif.

[21] Appl. No.: 14,932

[22] Filed: Feb. 8, 1993

[51] Int. Cl.5 ............................................. B60B 33/00
[52] U.S. Cl. ...................................... 16/19; 16/18 R; 16/44
[58] Field of Search ...................... 16/19, 44, 32, 18 R

[56] References Cited

U.S. PATENT DOCUMENTS

| Re. 24,230 | 10/1956 | Pearne | 254/1 |
|---|---|---|---|
| 1,958,905 | 5/1934 | Anderson | 280/124 |
| 2,139,503 | 12/1938 | Jordan | 16/19 |
| 2,227,875 | 1/1941 | Boden | 16/44 |
| 2,271,304 | 1/1942 | Mulholland | 16/44 |
| 2,282,506 | 5/1942 | Wachter | 16/44 |
| 2,582,716 | 1/1952 | Nelson | 16/44 |
| 2,707,795 | 5/1955 | Skupas | 16/44 |
| 2,891,764 | 6/1959 | Pearne | 254/1 |
| 3,441,974 | 5/1969 | Dean | 16/19 |
| 4,763,910 | 8/1988 | Brandli | 280/29 |
| 4,783,879 | 11/1988 | Weaver | 16/19 |

FOREIGN PATENT DOCUMENTS

| 2657737 | 6/1978 | Fed. Rep. of Germany . | |
|---|---|---|---|
| 4-287704 | 10/1992 | Japan | 16/19 |
| 192783 | 2/1938 | Switzerland | 16/44 |
| 423134 | 1/1935 | United Kingdom | 16/44 |
| 523115 | 7/1940 | United Kingdom | 16/44 |

Primary Examiner—Lowell A. Larson
Assistant Examiner—Donald M. Gurley
Attorney, Agent, or Firm—Terry J. Anderson; Karl J. Hoch, Jr.

[57] ABSTRACT

A retracting caster assembly is provided with a frame, a lever, a spring, a roller, and a manual retracting bolt. The lever is pivotally connected to the frame. The roller is connected to a first end of the lever. A spring loading member connects the spring to a second end of the lever. The spring biases the lever at a first position with the roller extended from the frame. The manual retracting bolt is adapted to manually move the lever to a second position with the roller retracted. The lever is suitably sized, shaped, and connected to the frame to hold the frame at a minimum predetermined distance from the ground until a predetermined weight is applied to the frame, at which point the linkage and lever arrangement decreases the mechanical advantage of the spring as the roller retracts, thereby minimizing the force required to retract the roller.

17 Claims, 4 Drawing Sheets

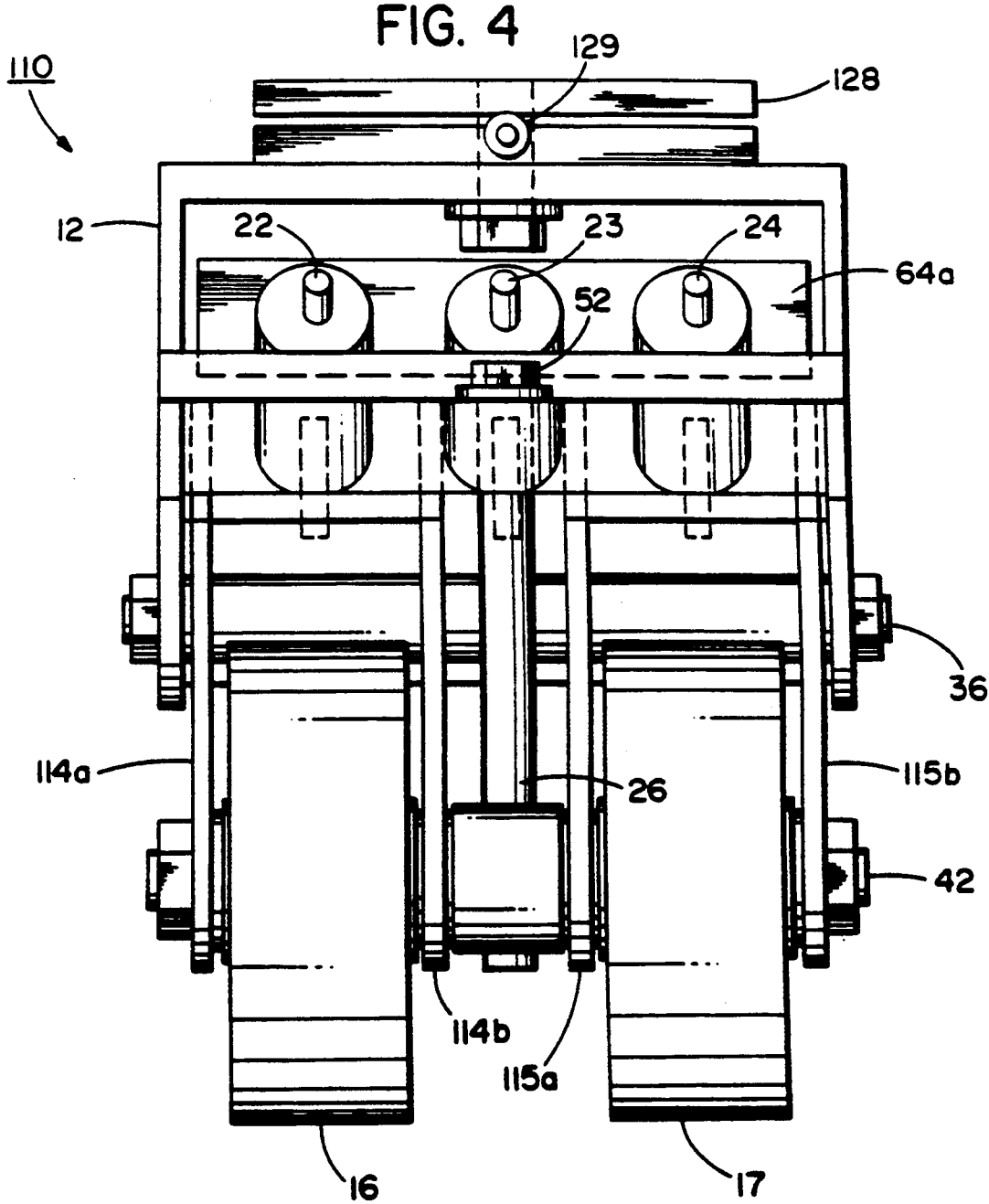

SPRING RETRACTING CASTER

The United States Government has a paid-up license in this invention and the right in limited circumstances to require the patent owner to license others on reasonable terms as provided for by the terms of contract F33657-81-C-0067 awarded by the United States Air Force.

BACKGROUND OF THE INVENTION

1. Field of the Invention

The present invention relates to a retractable caster and, more particularly, to a spring loaded retractable caster having a manual retraction feature.

2. Prior Art

U.S. Pat. No. 2,891,764 (Pearne) discloses a caster used for a jack transport with a compression spring holding a wheel mounted on the long side of a lever in an extended position. The spring is connected to the short side of the lever. U.S. Pat. No. Re. 24,230 (Pearne) discloses a caster to support a jack. The support are wheels mounted on a lever arm with springs mounted closer to the pivot point in compression to hold them extended before the load is applied. A screw is provided that allows for retraction. U.S. Pat. No. 1,958,905 (Anderson) discloses a wheel mounted on a rocker arm with a compression spring supporting it in an extended position. A threaded screw that passes through the spring can be used to adjust the spring or hold the wheel in retraction while allowing for retraction due to loading. U.S. Pat. No. 2,282,506 (Wachter) discloses a suspension system with a wheel mounted on the long side of a lever and a compression spring on the short side with means to adjust the spring's compression. U.S. Pat. Nos. 2,227,875 (Boden) and 4,763,910 (Brandli et al.) disclose casters with wheels mounted on one side of a lever and springs mounted on the other side to hold the wheels in extension. U.S. Pat. No. 2,139,503 (Jordan) discloses a caster with a height adjusting stud. U.S. Pat. No. 2,707,795 and German patent DE 2657737A1 are also cited of general interest.

SUMMARY OF THE INVENTION

In accordance with the one embodiment of the present invention, a retracting caster assembly is provided comprising a roller, a lever pivotally connected to the frame, a roller, a spring loading member, a spring, means for manually moving the roller to a retracted position relative to the frame, and means for automatically moving the roller to the retracted position upon a predetermined weight being applied to the frame. The roller is connected to a first end of the lever, a distance between a pivot of the lever to the frame and the roller forming a first lever arm section. The spring loading member is connected to a second end of the lever, the distance between the pivot and the spring loading member forming a second lever arm section. The spring is located between a portion of the spring loading member and the frame. The spring biases the lever second end to extend the lever first end and roller at an extended position relative to the frame. The means for automatically moving the roller to the retracted position can do so upon a predetermined weight being applied to the frame. The means for automatically moving comprises an effective working length of the first lever arm section increasing during the movement of the roller to its retracted position and, an effective working length of the second lever arm section decreasing during movement of the roller to its retracted position such that the means for automatically moving is decreasingly resistant to movement as weight is applied to the frame until a predetermined weight is loaded on the frame to retract the roller to a fully retracted position.

In accordance with another embodiment of the present invention, a retracting caster assembly is provided comprising a frame, a lever, a spring, and a wheel. The lever is pivotally connected to the front end of the frame. The lever has a first relatively long section extending generally rearwardly and downwardly from a pivot point of the lever to the frame, and a second relatively short section extending generally upwardly and forwardly from the pivot point. The first section extends along substantially the entire length of the frame. The spring is connected to an end of the second section biasing the second section towards the frame. The wheel is connected to an end of the first section.

In accordance with another embodiment of the present invention, a retracting caster assembly is provided comprising a frame, a lever, a roller, means for biasing the lever at a first position with the roller in an extending position, means for manually moving the lever from its first position to its second position with the roller in a retracted position, and means for automatically moving the lever from its first position to its second position. The means for automatically moving comprises means for automatically varying the force required to move the lever from its first position to its second position.

BRIEF DESCRIPTION OF THE DRAWINGS

The foregoing aspects and other features of the invention are explained in the following description, taken in connection with the accompanying drawings, wherein:

FIG. 4 is a rear elevational view of an alternate embodiment of a caster assembly incorporating features of the present invention.

DETAILED DESCRIPTION OF THE INVENTION

Figure 1:
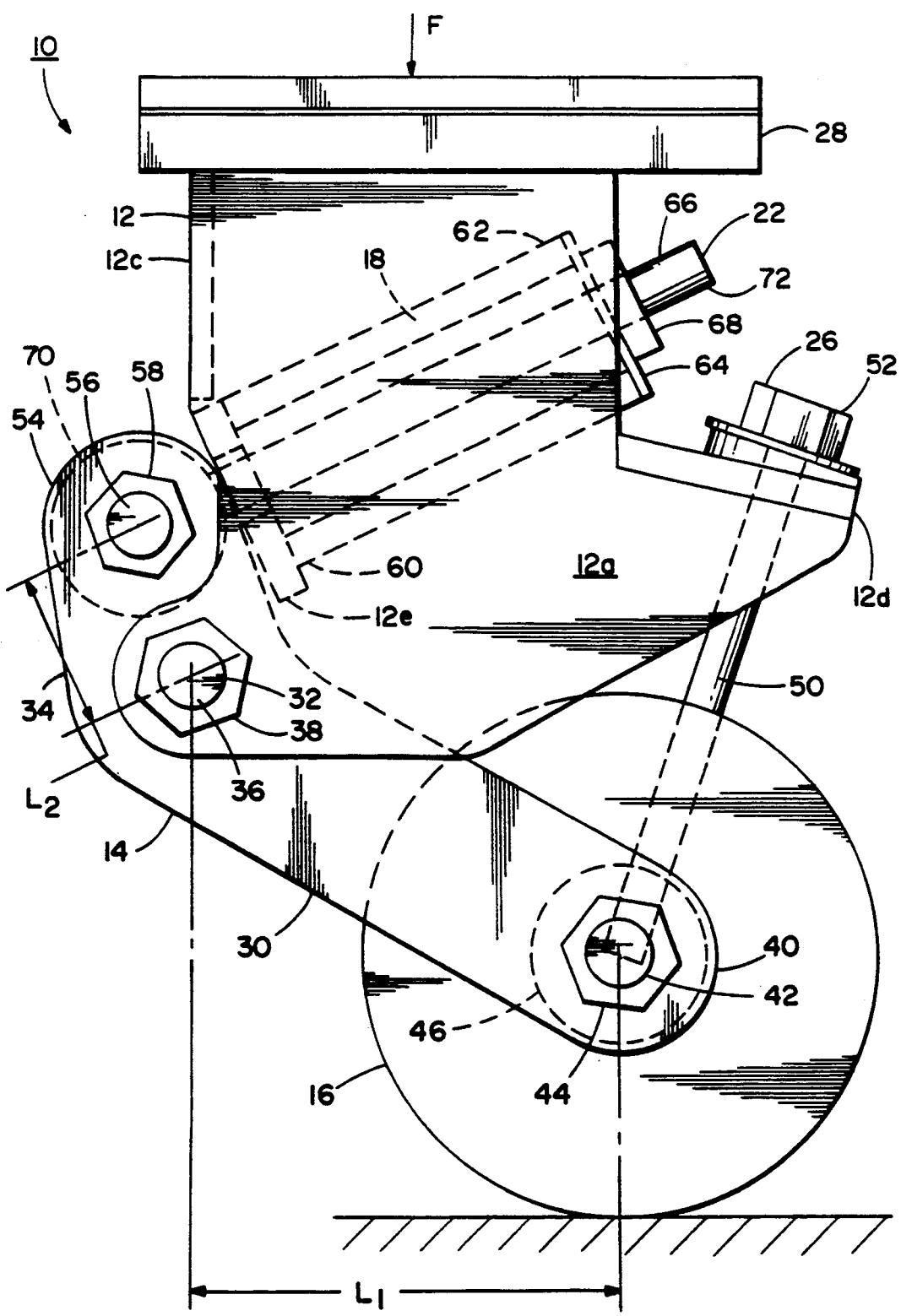
FIG. 1 is a plan side view of a retracting caster assembly incorporating features of the present invention.
Figure 2:
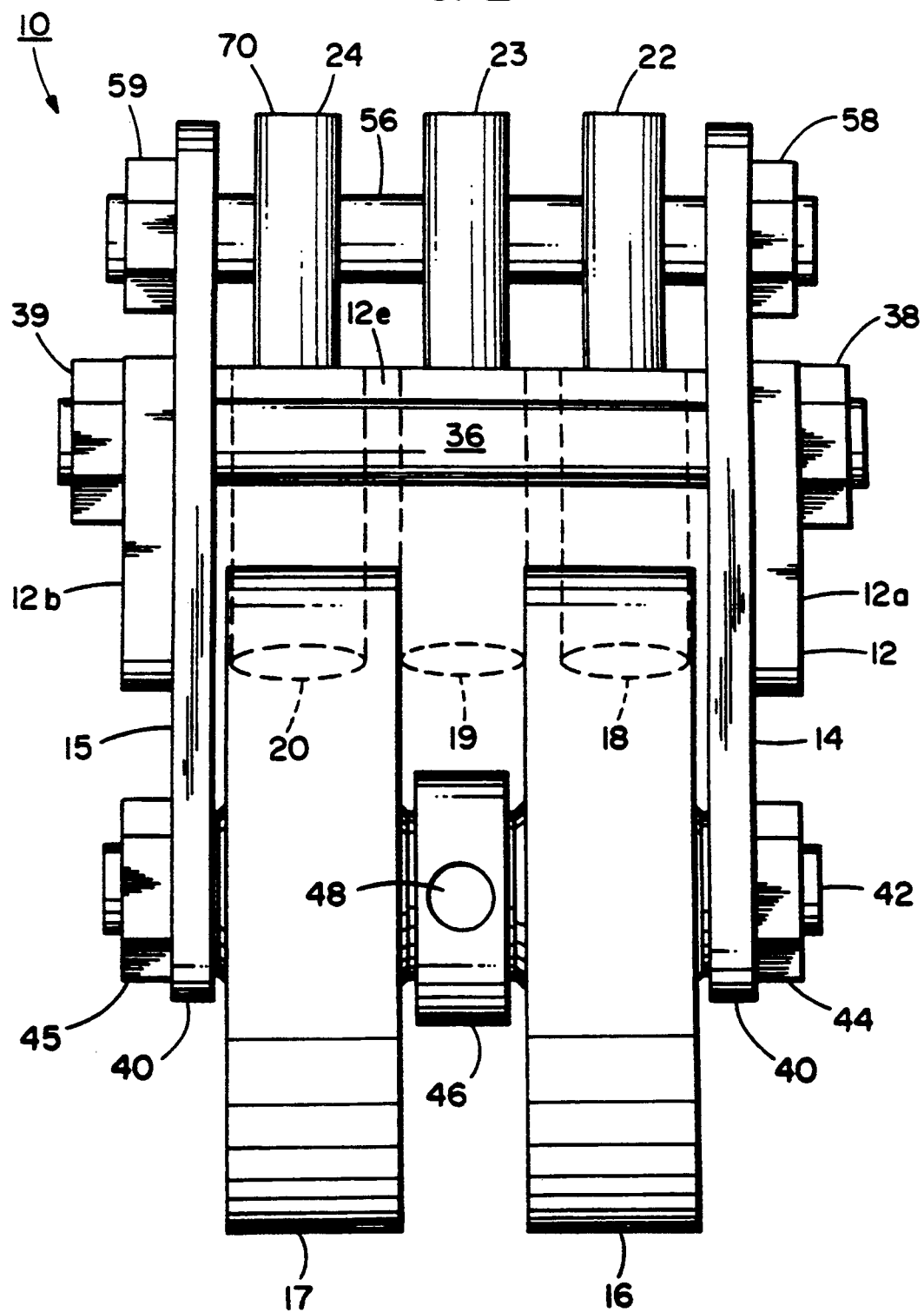
FIG. 2 is a top view of the caster assembly shown in FIG. 1.
Figure 3:
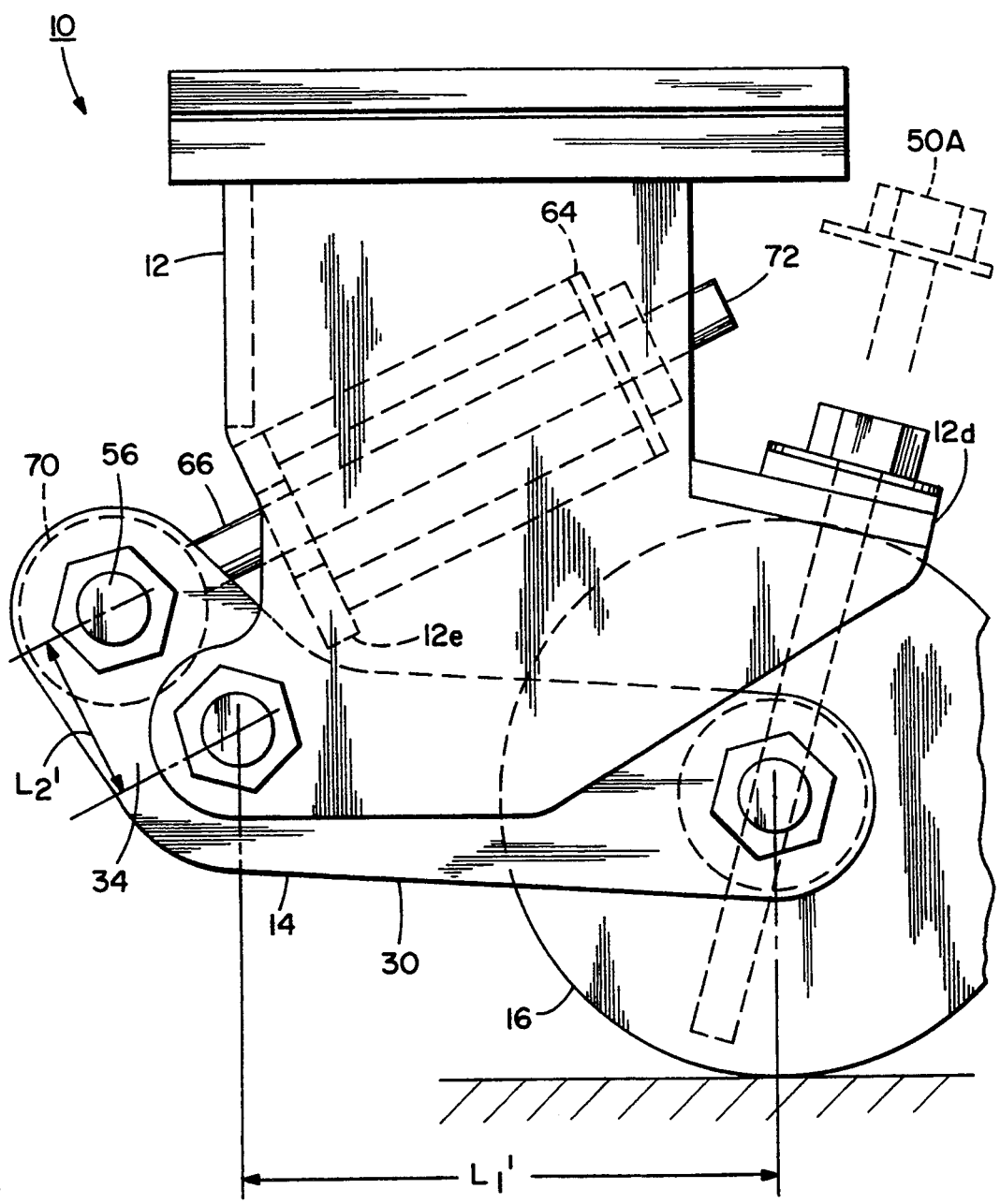
FIG. 3 is a plan side view of the caster assembly shown in FIG. 1 with the caster in its manually retracted position.

Referring to FIGS. 1-3, there is shown a retracting caster assembly 10 incorporating features of the present invention. The assembly generally comprises a frame 12, levers 14, 15, wheels 16, 17, springs 18, 19, 20, spring loaders 22, 23, 24, and a manual retractor 26. Although the present invention will be described with reference to the embodiments shown in the drawings, it should be understood that the present invention can be embodied in many alternative forms of embodiments. In addition, any suitable size, shape or type of elements or materials could be used.

The frame 12 is generally comprised of metal and is generally designed to enclose the springs 18-20 and support the levers 14, 15, springs 18-20, and manual retractor 26. Located at the top of the frame 12 is a rotatable section or swivel mount 28. The swivel mount 28 is adapted to be connected to an apparatus (not shown), such as an aircraft jack transport. The swivel mount 28 allows the assembly 10 to swivel for easier turning and movement of the apparatus supported on the assembly 10 or multiple assemblies. However, the swivel mount 28 need not be provided. Any suitable mounting system for connecting the assembly 10 to an object could be provided. The frame generally includes two side sections 12a, 12b, a front section 12c, a rear deck section 12d, and a front spring support section 12e.

The levers 14, 15 are also preferably comprised of metal. The levers 14, 15 are each pivotally connected to the frame side sections 12a, 12b, respectively. The levers 14, 15 are identical to each other with a first lever arm section 30 extending downwardly and rearwardly from the pivot 32, and a second lever arm section 34 extending upwardly and forwardly from the pivot 32. As can be seen, the first section 30 is angularly offset from the second section 34 to form an angle of about 145°. The pivot 32 is located at the front of the frame 12 and includes a threaded rod 36 and two nuts 38, 39. However, any suitable pivot could be provided.

The levers 14, 15 have first ends 40 at the end of their first sections 30. The wheels or rollers 16, 17 are rotatably mounted between the two first ends 40 by an axle 42 and two nuts 44, 45. Located at the center of the axle 42 is a section 46 with a hole 48. Threadingly mounted in the hole 48 is a first end of a screw bolt 50 of the manual retractor 26. A second end of the screw bolt 50 extends through a hole in the rear deck section 12d of the frame. The screw bolt 50 has a head 52 at a second end. The bolt 50 is adapted to axially longitudinally slide through the hole in the rear deck section 12d; blocked merely by the head 52 contacting the top of the rear deck section when extended and contact by the wheels 16, 17 with the bottom of the rear deck section when retracted. Of course, any suitable type and number of wheels or rollers could be provided as well as any suitable type of mounting of the wheels or rollers to the levers 14, 15. In addition, any number of levers could be used including one or more than two. However, due to their interconnection, the levers 14, 15 effectively act as one lever. Of course, multiple lever systems could also be employed.

The levers 14, 15 have second ends 54 at the ends of their second sections 34. A rod 56 is connected between the two second ends 54 by nuts 58, 59. The spring loaders 22–24 are connected to the rod 56. In the embodiment shown, there are three spring loaders; one for each of the springs. The springs 18–20, in the embodiment shown, are coil springs. Although three springs are shown, any suitable number of springs could be provided. The three springs are aligned in a side-by-side row with first ends 60 located adjacent the front spring support section 12e. Second ends 62 of the springs 18–20 are contacted by loading plates 64 of the spring loaders 22–24. Each of the spring loaders 22–24 generally comprise an elongate member 66, a loading plate 64, and a nut 68. Each of the elongate members 66 have a first end 70 connected to the rod 56, extend through holes in the front spring support section 12e, extend through a center of one of the coil springs, extend through a hole in its loading plate 64, and has its nut 68 connected to its second end 72.

FIG. 1 shows the assembly 10 with its wheels 16, 17 at an extended position. In this extended position, the wheels 16, 17 are able to rotate on the axle 42. The springs 18–20, spring loaders 22–24, frame 12, and levers 14, 15 cooperate with each other to keep the wheels 16, 17 in their extended position until either manually retracted by an operator or automatically retracted upon a predetermined weight or force F being applied to the top of the frame 12. FIG. 3 shows a side view of the assembly 10 with the wheels in the manually retracted position. Both manual and automatic retraction will be discussed in further detail below.

In the caster extended position shown in FIGS. 1 and 2, the springs 18–22 are preferably preloaded. The springs are compressed between the front spring support section 12e and the loading plates 64. The first ends 70 of the elongate members 66 bear against the opposite side of the front spring support section 12e. The nuts 68 are tightened on the elongate members 66 to move the loading plates 64 towards the front spring support section 12e until a desired preload is obtained. Of course, any suitable preload could be provided, such as to support 4000 pounds when used on an aircraft jack (not shown). When the springs are preloaded, the assembly 10 is able to keep the wheels 16, 17 in their extended position until a predetermined weight or force is applied to the top of the frame 12. After the predetermined weight or force is applied, the assembly 10 allows the wheels 16, 17 to automatically retract. In addition to the ability to adjust the preload by adjusting the nuts 68, one or more of the springs 18–20 could also be removed or added to provide a modular configurable caster assembly. This modular configurable caster assembly is provided due to the easy access to nuts 68 without having to disassemble other members of the assembly. Thus, in order to remove or disable one of the springs 18–20, one of the nuts 68 would be unscrewed from its elongate member 66, its loading plate 64 would be removed and the spring would be removed. In order to add a spring, the spring would merely be placed on an empty elongate member and a loading plate 64 and nut 68 would be attached to the elongate member to sandwich the added spring between the loading plate and the front spring support section 12e. Of course, concentric multiple coil springs could also be loaded over a single elongate member. The springs 18–20, by pushing on their loading plates 64 bias the elongate members 66 in the position shown in FIG. 1. The elongate members 66, due to their connection with the levers 14, 15 by the rod 56, bias the second arm sections 34 of the levers in the position shown in FIG. 1. Because the levers 14, 15 are pivotably mounted to the frame 12 at pivot 32, the first arm sections 30 of the levers are therefore biased in their extended positions shown in FIG. 1.

Upon the assembly 10 being loaded with a weight or force F suitably sized to overcome the preload force of the springs 18–20, the frame 12 will move towards the ground. As the frame 12 moves towards the ground, the levers 14, 15 are able to pivot at the pivot 32. The first arm section 30 of each lever will move upwardly relative to the frame 12 until the wheels 16, 17 contact the bottom of the rear deck section 12d as shown in FIG. 3. The distance that the frame moves down is preferably about 2 to 3 inches from the caster extended position shown in FIG. 1 to the caster retracted position shown in FIG. 3. As the levers 14, 15 pivot, the second arm sections 34 move forwardly and downwardly. The rod 56 pulls the spring loaders 22–24 with it. The springs 18–20 are therefore further compressed between the loading plates 64 and the front spring support section 12e. The effective working length of the second arm sections 34 decreases from the position shown in FIG. 1 ($L_2$) to the position shown in FIG. 3 ($L_2'$). The effective working length of the first arm sections 30 increase from the position shown in FIG. 1 ($L_1$) to the position shown in FIG. 3 ($L_1'$). These changes in effective working lengths combine to counteract or change, at least partially, the effect of the increasing spring forces caused by the springs being further compressed during caster retraction, by decreasing the effective lever length that the springs are acting upon (second lever arm sections 34) and increasing the effective lever length that the force on the top of the frame 12 is acting upon (first lever arm sections 30). Thus, the springs 18–20 do not provide a linear spring force effect. A non-linear spring force effect is provided as the levers 14,15 move. The result is a caster assembly capable of supporting a predetermined load relatively large without substantially retracting, but requires relatively little additional load past the predetermined load to fully retract. The present invention also takes advantage of spring characteristics to provide a relatively large amount of wheel travel while minimizing additional retraction load at the wheel. As noted above, because the screw bolt 50 is slidingly located in a hole in the rear deck section 12d, the screw bolt 50 is able to slide up to the position 50A shown in dashed lines in FIG. 3, its first end remaining stationary in the axle 42.

The manual retract 26 allows the casters to be retracted to the position shown in FIG. 3 before or during a load is being applied to the caster assembly 10 or the apparatus the caster assembly is carrying. The screw bolt 50 is merely tightened by an operator with a tool, such as a wrench. The first end of the screw bolt 50 screws through the axle hole 48. Because the head 52 is located above the rear deck section 12d, the screwing action of the screw bolt 50 pulls the axle 42 towards the rear deck section 12d. Therefore, the wheels 16, 17 and lever first ends 40 are pulled towards the rear deck section 12d. The levers 14, 15 rotate at the pivot 32, moving second ends 54, moving spring loaders 22–24, and compressing the springs 18–20. The screw bolt 50 is still able to slide up through the rear deck section 12d during manual retraction. This leaves the spring retraction mechanism intact as a "fail safe". Of course, any suitable type of manual retraction system could be provided.

Referring now to FIG. 4, an alternate embodiment of the present invention is shown. The caster assembly 110 is very similar to the assembly 10 shown in FIGS. 1–3, thus, like numbers are used to reference like members. However, the assembly 110 includes four levers 114a, 114b, 115a, 115b; two located on opposite sides of each wheel 16, 17 and all connected to the axle 42. The assembly 110 also comprises a single loading plate 64a fixed mounted to the spring loaders 22–24. Therefore, preload of the springs cannot be adjusted or altered after assembly. The assembly 110 also includes a swivel lock 129 on the swivel mount 128 such that the swivel mount 128 can be selectively locked in place.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A retracting caster assembly comprising:
a frame;
a lever pivotally connected to the frame;
a roller connected to a first end of the lever, a distance between a pivot of the lever to the frame and the roller forming a first lever arm section;
a spring loading member connected to a second end of the lever, the distance between the pivot and the spring loading member forming a second lever arm section;
a spring located between a portion of the spring loading member and the frame, the spring biasing the lever second end to extend the lever first end and roller at an extended position relative to the frame;
means connected to an axle of the roller and mounted on the frame for manually moving the roller to a retracted position relative to the frame; and
means for automatically moving the roller to the retracted position upon a predetermined vertical force being applied to the frame, the means for automatically moving comprising an effective working length of the first lever arm section increasing during movement of the roller to its retracted position and, an effective working length of the second lever arm section decreasing during movement of the roller to its retracted position.

2. An assembly as in claim 1 wherein the lever is pivotally connected to a front portion of the frame and the first lever arm section extends downwardly and rearwardly from the pivot.

3. An assembly as in claim 1 wherein the first lever arm section is relatively longer than the second lever arm section.

4. An assembly as in claim 1 wherein the means for manually moving comprises a bolt threadably connected to the axle of the roller such that the bolt can be axially rotated to move the axle relative to the frame.

5. An assembly as in claim 4 wherein the bolt is slidably mounted in a portion of the frame.

6. An assembly as in claim 1 wherein the lever first end is adapted to move about 2 to 3 inches during movement from the caster extended position to the caster retracted position.

7. An assembly as in claim 6 wherein the spring comprises a plurality of side-by-side coil springs.

8. An assembly as in claim 1 wherein the means for automatically moving is adapted to continue to operate when the means for manually moving the roller is being used to thereby function as a safety and allow gradual manual retraction of the roller.

9. An assembly as in claim 1 further comprising a swivel mount at the top of the frame.

10. A retracting caster assembly comprising:
a frame;
a lever pivotally connected to a front end of the frame, the lever having a first relatively long section extending generally rearwardly and downwardly from a pivot point of the lever to the frame, and a second relatively short section extending generally upwardly and forwardly from the pivot point, the first section extending along substantially the entire length of the frame;
a spring connected to an end of the second section biasing the second section toward the frame;
a wheel connected to an end of the first section; and
means connected to an axle of the wheel and mounted on the frame for manually moving the lever to overcome the bias of the spring.

11. An assembly as in claim 10 wherein the lever second section is angled relative to the lever first section and the lever's shape and attachment to the frame decreases mechanical advantage of the spring force on the lever as the lever is moved from a caster extended position to a caster retracted position.

12. An assembly as in claim 10 wherein the means for manually moving comprises a bolt threadably connected to an axle of the wheel and slidably mounted in a portion of the frame such that the bolt can be axially rotated to move the axle relative to the frame, but the bolt can slide relative to the frame when force on the frame overcomes the biasing force of the spring.

13. An assembly as in claim 10 wherein the spring comprises a plurality of side-by-side coil springs.

14. An assembly as in claim 13 further comprising means for disabling biasing action of at least one of the springs while allowing remaining active springs to continue to bias the second section towards the frame.

15. A retracting caster assembly comprising:
a frame;
a lever pivotally connected to the frame;
a roller connected to a first end of the lever;
means connected to the lever for biasing the lever to a first position with the roller in an extended position;
means connected to an axle of the roller and to the frame for manually moving the lever from its first position to a second position with the roller in a retracted position; and
means for automatically moving the lever from its first position to its second position upon a predetermined vertical force being applied to the frame, the means for automatically moving comprising the lever, the frame, and the means for biasing, the means for automatically moving automatically decreasing the force required to move the lever from its first position to its second position during movement of the lever from its first position to its second position.

16. An assembly as in claim 15 wherein the means for manually moving comprises a bolt threadably connected to the axle of the roller such that the bolt can be axially rotated to move the axle relative to the frame.

17. An assembly as in claim 16 wherein the bolt is slidably mounted in a portion of the frame.

* * * * *